United States Patent [19]
Shih

[11] Patent Number: 5,283,021
[45] Date of Patent: Feb. 1, 1994

[54] PROCESS FOR REMOVING THE SOLVENT FROM AN ELASTOMERIC POLYMER SOLUTION

[75] Inventor: Solomon W. F. Shih, Tainan City, Taiwan

[73] Assignee: Chi Mei Corporation, Taiwan

[21] Appl. No.: 76,572

[22] Filed: Jun. 14, 1993

[51] Int. Cl.$^5$ .................. B29B 13/08; B29C 47/76
[52] U.S. Cl. ........................... 264/102; 159/3; 159/48.1; 159/DIG. 10; 264/13; 264/349; 264/211.23; 366/75; 366/76; 425/203; 425/204; 425/205
[58] Field of Search ............... 264/12, 13, 101, 102, 264/349, 211-223; 425/203, 204, 205, 208; 366/75, 76, 91, 96; 159/3, 48.1, DIG. 10

[56] References Cited

U.S. PATENT DOCUMENTS

| | | | |
|---|---|---|---|
| 3,089,194 | 5/1963 | Goins | 264/102 |
| 3,494,987 | 2/1970 | Ioka et al. | 264/13 |
| 3,799,235 | 3/1974 | Moosavian et al. | 264/13 |
| 3,804,145 | 4/1974 | Arnold et al. | 159/DIG. 10 |
| 3,862,103 | 1/1975 | Campbell et al. | 159/DIG. 10 |
| 3,917,507 | 11/1975 | Skidmore | 425/204 |
| 3,920,604 | 11/1975 | Berg et al. | 264/13 |
| 3,968,003 | 7/1976 | Wolfe | 159/DIG. 10 |
| 3,981,957 | 9/1976 | van Brederode et al. | 264/13 |
| 4,115,316 | 9/1978 | Burke, Jr. | 159/DIG. 10 |
| 4,636,084 | 1/1987 | Kopernicky | 264/101 |

Primary Examiner—Jeffery Thurlow
Assistant Examiner—Mathiea Vargot
Attorney, Agent, or Firm—Brooks & Kushman

[57] ABSTRACT

The process is used to remove the solvent from an elastomeric polymer solution containing at least 8% by weight of elastomeric polymer. The elastomeric polymer solution undergoes a preprocessing step in order to remove a large part of the solvent. Thereafter, the elastomeric polymer solution is fed into a main extruder in order to remove the remaining solvent. The preprocessing step includes: (a) introducing a heating fluid and the elastomeric polymer solution into a static mixer in order to mix the heating fluid and the elastomeric polymer solution and heat rapidly the elastomeric polymer solution to a temperature of 60°-250° C.; (b) spraying the mixture of heating fluid and elastomeric polymer solution under a depressurization atmosphere in order to vaporize the heating fluid and solvent out of the mixture and form a vaporized heating fluid, a vaporized solvent and a powdered elastomeric polymer; (c) introducing the vaporized heating fluid, the vaporized solvent and the powdered elastomeric polymer into a fluid-solid separation chamber; and (d) extruding the powdered elastomeric polymer into the main extruder via a polymer outlet of the fluid-solid separation chamber while removing the vaporized heating fluid and solvent via a vapor outlet of the fluid-solid separation chamber.

7 Claims, 4 Drawing Sheets

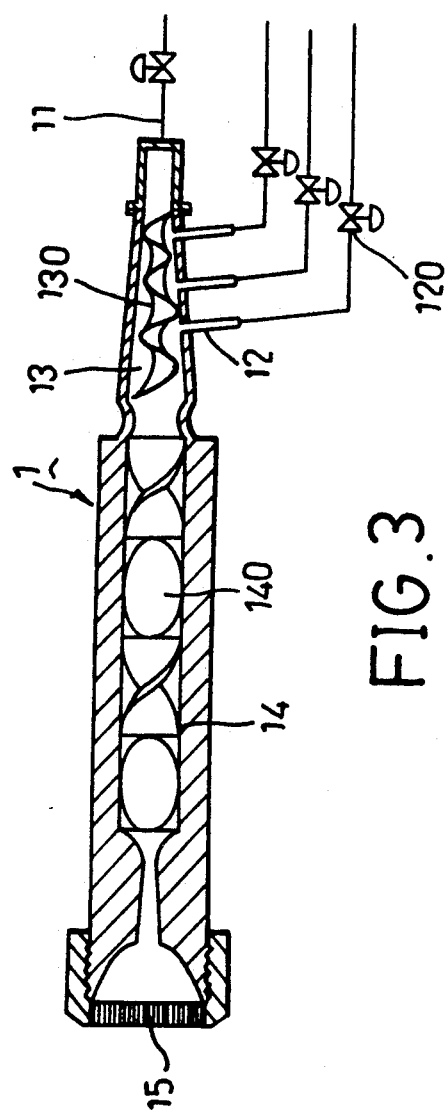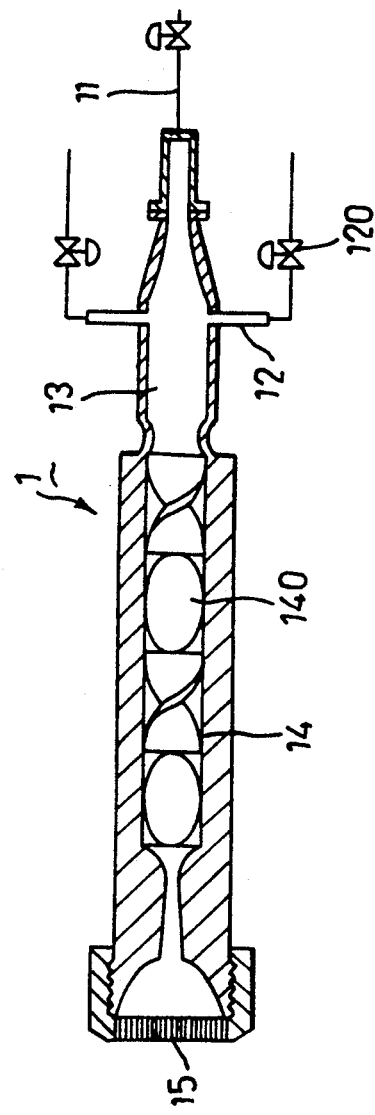

PROCESS FOR REMOVING THE SOLVENT FROM AN ELASTOMERIC POLYMER SOLUTION

BACKGROUND OF THE INVENTION

1. Field of the Invention

This invention relates to a process for removing the solvent from a polymer solution, more particularly to a process for removing the solvent from an elastomeric polymer solution which has a polymer content of at least 8% by weight.

2. Description of the Related Art

A high pressure steam stripping process and a direct solvent removing process have been employed in order to remove the solvent from an elastomeric polymer solution so as to form subsequently granules and crumbs of the elastomeric polymer.

In the high pressure steam stripping process, high pressure steam is used to remove the solvent from an elastomeric polymer solution. The high pressure steam is introduced into the elastomeric polymer solution in order to heat the elastomeric polymer solution and vaporize the solvent in the elastomeric polymer solution. Afterwards, a large part of the water, about 45% by weight, left in the elastomeric polymer solution is removed with the use of a water removing device, and the remaining water is subsequently removed with a degassing device, such as a single-screw extruder, a twin-screw extruder or a conventionally used expeller with an expander followed by a steam heated dryer, until a residual water content of less than 1% by weight is obtained. Since the polymer solution is heated indirectly by the steam, the problem of localized overheating can be eliminated, and the elastomeric polymer can be prevented from becoming a gel to avoid loss of the elastic characteristics of the former. For these reasons, the solvent in the elastomeric polymer solutions of polybutadiene rubber and polyisoprene rubber are generally removed by this method. However, the cost for removing a large amount of water with the use of this heating method is considerably high. Furthermore, a certain level of residual water, about 5–10%, will be left in the dewatered product of the elastomeric polymer. In order to remove the residual water in the dewatered product, a drying machine, which has a high electrical consumption, is required. In addition, all of the removed water must be treated before discharging. Thus, the high pressure steam stripping process is not an economical process.

A direct solvent removing process for removing the solvent from a solution of a polymer has been disclosed in Luxembourg Patent Application No. 86810. Referring to FIG. 1, the direct solvent removing process uses a solvent removing apparatus (B) which includes an extruder (92) that incorporates a twin endless screw (94). The elastomeric polymer solution, which has been preheated to 150°–200° C., is introduced into a feed hopper (90) of the extruder (92). The extruder (92) further comprises a rear ventilation vent (80) through which a large amount of the solvent, namely from 80 to 95% of the latter, will be removed. The polymer solution is driven forward by means of the endless screw (94) and is reheated simultaneously to a temperature of between 150° C. and 200° C. The heat input can be produced by heating the extruder barrel to a temperature of between 180° C. and 250° C., by providing the screw with components that introduce shearing forces or by a combination of both. Three ventilation vents (81, 82, 83) are arranged on the extruder (92). The remaining solvent is removed progressively through the various ventilation vents (81, 82, 83) in step with the forward movement of the polymer solution in the screw (94), while the vacuum increases in step with the progress of the polymer solution in the screw and changes from atmospheric pressure to approximately 5 mbars at the screw end. Between the ventilation vents (81, 82, 83), means (96) for introducing a fluid, generally water, has been provided to promote the removal of the solvent. The polymer solution, freed from its solvent in this manner, passes through a die (24') and is cut into granules. Therefore, a residual solvent content equal to or lower than 0.1% by weight is obtained.

In the above patent, the polymer is reheated by the screw barrel. The rate of heating is relatively low when the viscosity of the elastomeric polymer solution is high. In addition, the direct solvent removing process is not suitable for treating a heat-sensitive polymer. When the direct solvent removing process is used to treat polybutadiene rubber solution, which has a high viscosity, a long heating time is needed in order to heat the polybutadiene rubber solution to a temperature of between 150° C. and 200° C. in the twin-screw extruder (WP type ZSK-57). The prolonged heating results in crosslinking of parts of the polybutadiene rubber, thus causing a loss in the elastic characteristics of the latter. When such a partially crosslinked elastomeric polymer is used to modify an impact-resistant polystyrene, hard grains or fisheyes are formed on the surface of the resultant modified product. Aside from the formation of fisheyes, the polybutadiene rubber may further lose its modification effect when the polybutadiene rubber undergoes crosslinking. Therefore, the direct solvent removing process is not suitable for treating a heat-sensitive polymer with a high viscosity.

Another problem of the above patent stems from the design of the ventilation vents of the apparatus (B). A large amount of fine elastomer particles are entrained by the venting solvent, thereby clogging the ventilation vents. The removal of the clogging particles requires a shutdown operation, thereby lowering the efficiency of the apparatus (B). Due to the rapid vaporization of the solvent because of the reduced pressure at the ventilation vents, bubbles form rapidly in the elastomeric polymer, thereby resulting in the formation of fine elastomer particles. The bubbles in the elastomeric polymer produce fine elastomer particles upon breakage of the same. For example, the direct solvent removal process and the apparatus (B) are used to treat a styrene-butadiene-styrene block copolymer solution. When the styrene-butadiene-styrene block copolymer solution is moved forward in the screw (94) in order to remove the remaining solvent via the various ventilation vents (81, 82, 83), fine particles of the styrene-butadiene-styrene block copolymer are produced and block the ventilation vents (81, 82, 83). Thus, the operation of the apparatus (B) should be stopped frequently to maintain the ventilation vents (81, 82, 83).

U.S. Pat. No. 3,917,507 discloses a countercurrent combined liquid and vapor stripping process in a screw devolatilizer. This patent generally relates to a process and apparatus for removing volatile and soluble components from plastic material in a screw extruder. The screw extruder has a vent which is provided with a vapor removal means in order to prevent clogging of the vent. The screw extruder has a stripping zone which defines a high pressure downstream point, a low pressure upstream point and a stripping agent injection point that is located between the high pressure downstream point and the low pressure upstream point. The vent of the screw extruder is located in the stripping zone and upstream from the stripping agent injection point. The stripping agent is a liquid-gas mixture which flows in the screw extruder in a countercurrent direction with respect to the plastic material in order to remove the undesirable volatile components and the solvent from the latter via the vent. The vapor removal means in the port includes twin interlocking screws that are surrounded by a closely fitting housing with a clearance that is sufficient to permit only gases and liquids to pass therethrough. The twin interlocking screws are pitched and are rotated by a drive motor in a direction so as to force entrained solids back toward the plastic mass in the screw extruder. Therefore, the port is prevented from being clogged. It is noted that the screw extruder which incorporates the twin interlocking screws is similar to a pair of intermeshing co-rotating twin screw extruders which are fed transversely in a second pair of twin screws in order to produce devolatilization and which have been taught in German Patent No. 915,689 by R. Erdmenger et al. In the U.S. Pat. No. 3,917,507, the screw extruder has a housing that is surrounded by a heating jacket. Because the polymer material in the screw extruder is heated by means of the heating jacket, the heating time needed for heating the polymer material to a predetermined temperature is relatively long if the shear force heat is not effective. Therefore, the apparatus in the U.S. Pat. No. 3,917,507 is only suitable for treating plastics which have a low volatile component content, such as ABS polymers (acrylonitrile-butadiene-styrene), and is not suitable for treating an elastomeric polymer solution and a material which has a high solvent content, even though the port has been designed to prevent clogging.

Accordingly, the main problems of the above described conventional solvent removing processes reside in that fine particles of the elastomeric polymer easily clog the ventilation vents, and crosslinking of the elastomeric polymer solution, which has a high elastomeric polymer content and a high viscosity, occurs easily due to overheating, thus causing the elastomeric polymer to lose easily its elasticity.

SUMMARY OF THE INVENTION

Therefore, the objective of the present invention is to provide an improved process for removing the solvent from an elastomeric polymer solution which contains at least 8% by weight of elastomeric polymer. The improved process can heat rapidly the elastomeric polymer solution and can extrude efficiently the elastomeric polymer so that vapor removal vents which are provided in the improved process can be prevented from being clogged and so that the elastomeric polymer can be prevented from losing its elasticity due to crosslinking.

Accordingly, the improved process of the present invention is used to remove the solvent from an elastomeric polymer solution which contains at least 8% by weight of elastomeric polymer. The elastomeric polymer solution undergoes a preprocessing step in order to remove a large part of the solvent. Thereafter, the elastomeric polymer solution is fed into a main extruder which has a screw mechanism provided therein so that the elastomeric polymer solution is moved forward in the main extruder in order to remove the remaining solvent via at least one vapor removal vent of the main extruder. The preprocessing step includes the steps of: (a) introducing a heating fluid and the elastomeric polymer solution into a static mixer in order to mix completely the heating fluid and the elastomeric polymer solution and heat rapidly and homogeneously the elastomeric polymer solution to a temperature of between 60° C. and 250° C.; (b) spraying the mixture of the heating fluid and the elastomeric polymer solution into a vaporizing chamber under a depressurization atmosphere in order to vaporize the heating fluid and the solvent from the mixture and form a vaporized heating fluid, a vaporized solvent and a powdered elastomeric polymer; (c) introducing the vaporized heating fluid, the vaporized solvent and the powdered elastomeric polymer into a fluid-solid separation chamber which has a pair of intermeshing twin extruding screws mounted therein; and (d) extruding the powdered elastomeric polymer into the main extruder via a polymer outlet of the fluid-solid separation chamber by means of the intermeshing twin extruding screws while removing the vaporized heating fluid and the vaporized solvent via a vapor outlet of the fluid-solid separation chamber.

The step (d) may include removing the vaporized heating fluid and the vaporized solvent by suction via a vacuum unit connected to the vapor outlet. The step (b) may be conducted by spraying the mixture via a nozzle into a vaporizing chamber which has a wall with a gradually diverging cross-section. The intermeshing twin extruding screws used in step (d) may be operated at a speed of 50–300 rpm. The elastomeric polymer of the elastomeric polymer solution is selected from the group consisting of butadiene homopolymer, isoprene homopolymer, ethylene-propylene block copolymer and vinyl-aromatic/conjugated diene copolymer. The heating fluid used in step (a) is selected from the group consisting of water, hexane, heptane, cyclohexane, pentane, isopentane, benzene, toluene, ethyl benzene, and acetone and may be in a vapor phase.

BRIEF DESCRIPTION OF THE DRAWINGS

Other features and advantages of the present invention will become apparent in the following detailed description of the preferred embodiments, with reference to the accompanying drawings, in which:

FIG. 3 is a sectional view of an embodiment of a mixing unit of the feeding apparatus shown in FIG. 2.

FIG. 4 is a sectional view of another embodiment of the mixing unit of the feeding apparatus shown in FIG. 2.

DETAILED DESCRIPTION OF THE PREFERRED EMBODIMENT

Figure 1:
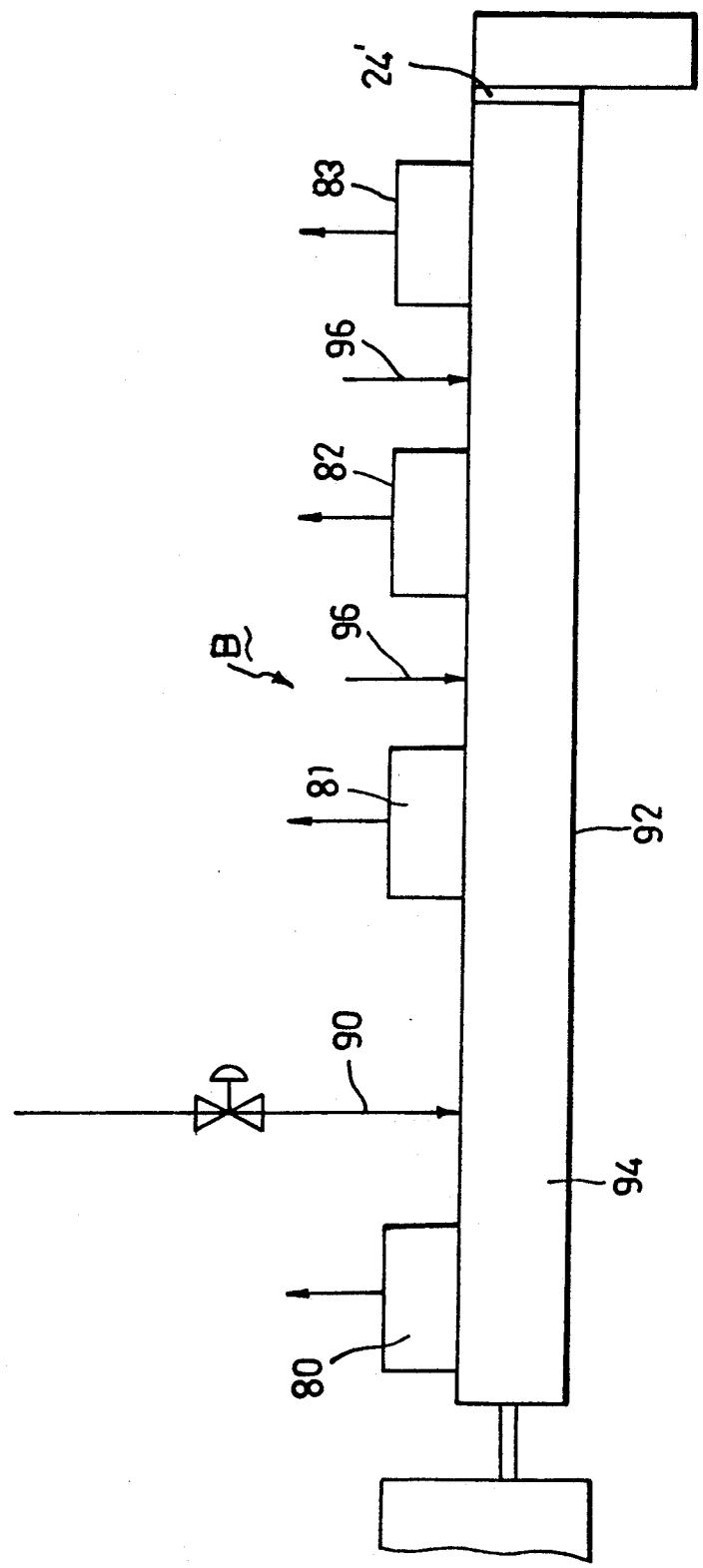
FIG. 1 is a schematic view of a solvent removing apparatus used in a conventional direct solvent removing process for removing the solvent from an elastomeric polymer solution.
Figure 2:
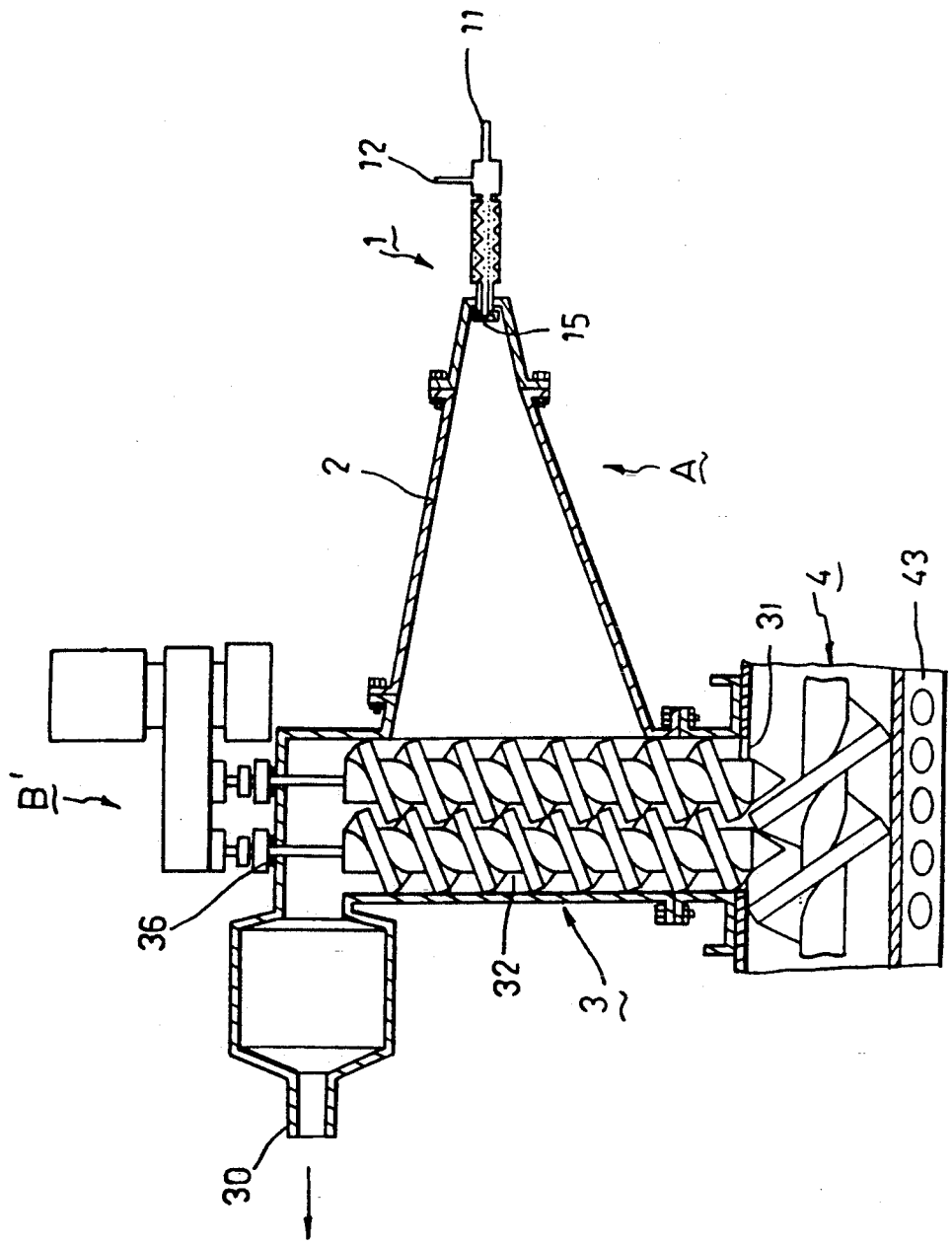
FIG. 2 is a partially sectional schematic view of a solvent removing device used in the improved process of the present invention.

The process of the present invention for removing the solvent from an elastomeric polymer solution includes a preprocessing step in order to remove a large part of the solvent and thereafter feeding the elastomeric polymer solution into a main extruder in order to remove the remaining solvent. The elastomeric polymer solution can have a polymer content of at least 8% by weight, preferably at least 12% by weight. The elastomeric polymer can be selected from the group consisting of a butadiene homopolymer, an isoprene homopolymer, an ethylene-propylene block copolymer, such as ethylene-propylene terpolymer (EPDM), and a vinyl-aromatic/conjugated diene copolymer in which the conjugated diene fraction is partially hydrogenated or is not hydrogenated. Therefore, the elastomeric polymer treated in the process of the present invention may include styrene-butadiene block copolymer, styrene-butadiene star-shaped copolymer, styrene-isoprene block copolymer and styrene-isoprene star-shaped copolymer.

The preprocessing step includes the steps of: (a) introducing a heating fluid and the elastomeric polymer solution into a static mixer in order to mix completely the heating fluid and the elastomeric polymer solution and heat rapidly and homogeneously the elastomeric polymer solution to a temperature of between 60° C. and 250° C.; (b) spraying the mixture of the heating fluid and the elastomeric polymer solution into a vaporizing chamber under a depressurization atmosphere in order to vaporize the heating fluid and the solvent from the mixture and form a vaporized heating fluid, a vaporized solvent and a powdered elastomeric polymer; (c) introducing the vaporized heating fluid, the vaporized solvent and the powdered elastomeric polymer into a fluid-solid separation chamber which has a pair of intermeshing twin extruding screws mounted therein; and (d) extruding the powdered elastomeric polymer into the main extruder via a polymer outlet of the fluid-solid separation chamber by means of the intermeshing twin extruding screws while removing the vaporized heating fluid and the vaporized solvent via a vapor outlet of the fluid-solid separation chamber. It is noted that the heating fluid used in the present invention can be steam or a preheated solvent which is selected from the group consisting of hexane, heptane, cyclohexane, pentane, isopentane, benzene, toluene, ethylbenzene, acetone, etc. The material of the heating fluid can be different from the solvent of the elastomeric polymer solution. The temperature of the resultant heated elastomeric polymer solution depends on the amount and pressure of the heating fluid.

The process of the present invention is used with a solvent removing device (B') which is shown in FIGS. 2 to 5. Referring to FIGS. 2 to 5, the solvent removing device (B') has a feeding apparatus (A) which includes a mixing unit (1), a vaporizing chamber (2), a fluid-solid separation chamber (3) and a main extruder (4) that is connected to the fluid-solid separation chamber (3). The mixing unit (1) includes a premixing chamber (13) which has a polymer inlet (11), at least one heating fluid inlet (12) and a back pressure check valve (120) provided upstream of a respective heating fluid inlet (12). The heating fluid inlet (12) may be a multi-stage inlet. The mixing unit (1) further includes a known static mixer (14) which is connected to the premixing chamber (13) and which is disposed downstream of the premixing chamber (13). The static mixer (14) has a nozzle (15) mounted on the downstream end thereof and a mixing mechanism (140). An embodiment of the premixing chamber (13) is shown in FIG. 3 and has three heating fluid inlets (12) mounted on one side of the premixing chamber (13) and a spiral mixing mechanism (130). Another embodiment of the premixing chamber (13) is shown in FIG. 4 and has two opposite heating fluid inlets (12) mounted respectively on two sides of the premixing chamber (13) so as to prevent an unbalanced force caused by a fed heating fluid.

The vaporizing chamber (2) is connected to and is disposed downstream of the mixing unit (1). The vaporizing chamber (2) has an inclined wall with a cross-section that diverges gradually toward a downstream end thereof. The wall of the vaporizing chamber (2) may have a curved cross-section. The inner wall of the vaporizing chamber (2) is provided with an anti-stick coating layer of polytetrafluoroethylene.

The fluid-solid separation chamber (3) is connected to and is disposed downstream of the vaporizing chamber (2). The fluid-solid separation chamber (3) has a pair of intermeshing twin extruding screws (32) connected to the interior of the vaporizing chamber (2), a fluid outlet (30) which is connected to a vacuum unit (not shown) and a polymer outlet (31) which is connected to a feeding port of the main extruder (4). The pair of intermeshing twin extruding screws (32) extend from the fluid outlet (30) to the polymer outlet (31) and rotates simultaneously to prevent fine particles entrainment. Therefore, when the elastomeric polymer solution is introduced into the fluid-solid separation chamber (3), only gases and liquids are permitted to pass therethrough for removal via the fluid outlet (30), while the solids are extruded into the main extruder (4) via the polymer outlet (31). It is noted that the intermeshing twin extruding screws (32) can rotate in a same direction (i.e. co-rotating) or in opposite directions (i.e. counter-rotating) and that sealing members (36), such as gland packing, are attached to the shafts of the intermeshing twin extruding screws (32) so as to prevent leakage.

Figure 5:
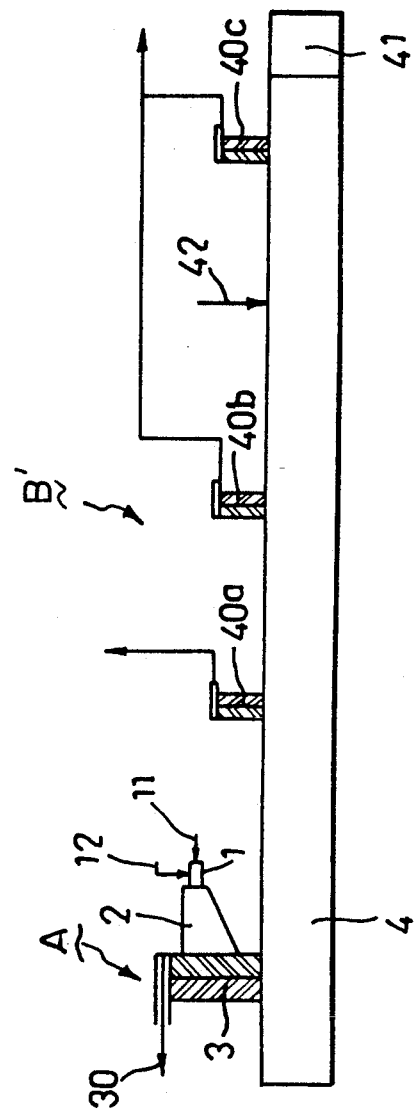
FIG. 5 is a schematic view of the solvent removing device shown in FIG. 2.

The main extruder (4) may be a single-screw extruder, a twin-screw extruder or a multiple-screw extruder. The screws of a screw mechanism which is provided in the main extruder (4) can rotate in the same direction or in different directions. The rotating speed of the screw is between 50 rpm and 300 rpm, preferably between 150 rpm and 250 rpm. A heating apparatus can be provided around the main extruder (4) and can include an oil heating tube (43) or an electrical heating plate. Referring to FIG. 5, the main extruder (4) is provided with three ventilation ports (40a, 40b, 40c) which are respectively disposed downstream of the feeding port of the main extruder (4). Twin intermeshing screws may be mounted in each ventilation port (40a, 40b, 40c) in order to permit only gases and liquids to pass through the latter and in order to force entrained solids back toward the polymer mass in the main extruder (4). The number of the ventilation ports used can depend on the content of the residual solvent and water. Between the ventilation ports (40b, 40c), a stripping agent is added via an injection port (42) for promoting the removal of the solvent and volatile components. The amount of the stripping agent is preferably 0.5-5% by weight of the amount of elastomeric polymer. The stripping agent can be selected from the group consisting of water, ethylbenzene, butane, pentane, heptane and hexane. The main extruder (4) further has a die (41) through which the solvent removed resultant product of the elastomeric polymer passes.

Referring again to FIGS. 2 to 5, the elastomeric polymer solution, which is under a predetermined back pressure, is fed by a pump (not shown) into the premixing chamber (13) via the polymer inlet (11) while a pressurized heating fluid, such as steam at a pressure above 3 bars, is fed into the premixing chamber (13) via the heating fluid inlet (12). Thereafter, the elastomeric polymer solution and the heating fluid, which have been premixed, are fed into the static mixer (14) in order to mix completely the elastomeric polymer solution and the heating fluid so as to heat rapidly and homogeneously the elastomeric polymer solution to a temperature of between 60° C. and 250° C. in about 3 seconds. The mixture of the elastomeric polymer solution and the heating fluid therefore has a temperature of between 60° C. and 250° C. when the mixture leaves the static mixer (14). It has been known that the heating rate and the final temperature of the heated elastomeric polymer solution depend on the pressure of the heating fluid. When the pressure of the steam is below 3 bars, the heated elastomeric polymer solution would have a temperature of below 60° C., thereby resulting in a poor solvent removing efficiency. If the heated elastomeric polymer solution with a temperature of above 250° C. is prepared, that is, a high pressure steam is required, thereby resulting in thermal degradation of the polymer.

After mixing the elastomeric polymer solution and the heating fluid in the mixing unit (1) to obtain a temperature above the boiling point of the solvent, the mixture of the elastomeric polymer solution and the heating fluid is sprayed into the vaporizing chamber (2) via the nozzle (15) so that a depressurization atmosphere is created. Under such a condition, the heating fluid and the solvent vaporize from the mixture to form a vaporized heating fluid and a vaporized solvent while bubbles form rapidly in the elastomeric polymer so as to form fine particles of powdered elastomeric polymer. Since the elastomeric polymer solution is heated rapidly, the elastomeric polymer can be prevented from thermal degradation and crosslinking owing to prolonged heating. In addition, the amount of the steam used as the heating fluid is smaller than that used in the previously described high pressure steam stripping process.

The vaporized heating fluid, the vaporized solvent and the powdered elastomeric polymer are then introduced into the fluid-solid separation chamber (3). By means of the intermeshing twin extruding screws (32), the vaporized heating fluid and solvent are removed by suction with the use of a vacuum unit (not shown) that is connected to the fluid outlet (30), while the powdered elastomeric polymer is extruded into the main extruder (4) via the polymer outlet (31) and the feeding port of the main extruder (4). Generally, approximately 20-95 wt %, preferably 40-95 wt %, of the solvent in the elastomeric polymer solution is removed via the fluid outlet (30). Afterwards, the powdered elastomeric polymer is heated and melted and is extruded forward in the main extruder (4). The remaining solvent is removed via the ventilation ports (40a, 40b, 40c), while the stripping agent is added to promote the removal of the solvent and volatile components. Finally, the elastomeric polymer that is freed from its solvent and volatile components is passed through the die (41).

The following examples are given in order to facilitate explanation of the present invention.

COMPARATIVE EXAMPLE 1

The conventional direct solvent removing process which has been disclosed in Luxembourg Patent Application No. 86810 and which incorporates the solvent removing apparatus (B), shown in FIG. 1, is used to treat the hexane solution of an elastomeric polymer which has a polymer content of 20% by weight. The three elastomeric polymers which will be treated include styrene-butadiene-styrene block copolymer (a) with a styrene content of 30% by weight, styrene-butadiene styrene block copolymer (b) with a styrene content of 10% by weight, and butadiene homopolymer (c) which is a low-cis butadiene rubber and which is sold under the trade name of Asahi-kasei 35AS. The screw extruder (92) is a fully intermeshing twin screw extruder (Werner & Pfleidere ZSK-35) and has a length of 120 cm (L/D=40). Each elastomeric polymer solution is preheated to 200° C. and is pumped by a gear pump into the feed hopper (90) of the extruder (92). The speed of the screw (94) is 200 rpm. The pressures provided in the ventilation vents (80, 81, 82, 83) are 10 mbars, 5 mbars, 5 mbars and 5 mbars, respectively. The temperature of the screw extruder (92) is 210° C. Water is used as the stripping agent and is added between the ventilation vent (82) and the ventilation vent (83) in order to promote the removal of the solvent.

TABLE 1

| polymer solution | vent (80) | vent (81) | vent (82) | vent (83) |
| --- | --- | --- | --- | --- |
| (a) | 25 min | 4 hr | no clogging | no clogging |
| (b) | 25 min | 1 hr | 1 hr | 20 min |
| (c) | 3 min | 10 min | 14 min | 10 min |

Table 1 shows the times taken from the beginning of the operation of the screw extruder until the ventilation vents (80, 81, 82, 83) are clogged by each of the powdered elastomeric polymers (a), (b) and (c). The elastomeric polymer, which has a high styrene content and a low viscoelasticity, does not easily bubble when the solvent is vaporized rapidly, thereby preventing clogging of the ventilation vents. A large part of the solvent is removed via the ventilation vent (80) and the remaining solvent is removed via the ventilation vents (81, 82, 83). Therefore, according to Table 1, it can be realized that the ventilation vent (80) is easily clogged by the powdered elastomeric polymer whereas the ventilation vents (81, 82, 83) are not easily clogged.

It is noted that the ventilation vents (81, 82) as well as the ventilation vent (80) are clogged easily by the powdered elastomeric polymer when there is no vacuum units connected to the ventilation vent (80). When a vacuum unit is connected to the ventilation vent (80) in order to facilitate the solvent's removal via the ventilation vent (80) so as to reduce the residual solvent in the elastomeric polymer solution, the ventilation vents (81, 82, 83) are not easily clogged. Thus, it can be realized that the amount of powdered elastomeric polymer produced at each ventilation vent (81, 82, 83) depends on the residual solvent content in the elastomeric polymer solution.

TABLE 2

| polymer solution | stripping agent | vent (80) | vent (81) | vent (82) | vent (83) |
| --- | --- | --- | --- | --- | --- |
| (a) | water | 25 min | 4 hr | no clogging | no clogging |
| (a) | hexane | 25 min | 1 hr | 1 hr | 20 min |

Table 2 shows the times taken from the beginning of the operation of the screw extruder until the ventilation vents (80, 81, 82, 83) are clogged by the powdered elastomeric polymer (a) of styrene-butadiene-styrene block copolymer with a 30% styrene content when the stripping agent used in the apparatus (B) is water or hexane, respectively. According to Table 2, it has been shown that the ventilation vent (83) is easily clogged when hexane, which can dissolve the styrene-butadiene-styrene block copolymer, is used as the stripping agent.

Therefore, the conventional direct solvent removing process which utilizes the solvent removing apparatus (B) is limited to treating an elastomeric polymer which has a high styrene content and which has a physical property similar to that of plastics. The solvent in the elastomeric polymer solution is generally a highly volatile solvent. For example, the solvent used in the polybutadiene elastomeric polymer solution is hexane, which has a boiling point of 69° C., or cyclohexane, which has a boiling point of 80.7° C. When such an elastomeric polymer solution is preheated to a temperature of 150°-200° C. and is pumped into the feed hopper, the solvent is vaporized rapidly, and the bubbles form rapidly in the elastomeric polymer, thereby clogging the ventilation vents. Thus, the conventional direct solvent removing process is not suitable for mass production.

COMPARATIVE EXAMPLE 2

The conventional direct solvent removing process which has been disclosed in Luxembourg Patent Application No. 86810 and which incorporates the solvent removing apparatus (B), shown in FIG. 1, is used to treat a hexane solution of elastomeric polymer, which has a polymer content of 20% by weight. The three elastomeric polymers which are to be treated include low-cis polybutadiene rubber (d) produced by Japan Asahi-kasei corporation in the presence of an organolithium catalyst and sold under the trade name of Asadene 35AS, low-cis polybutadiene rubber (e) produced by Japan Asahi-kasei corporation in the presence of an organo-lithium catalyst and sold under the trade name of Asadene 55AS, and high cis polybutadiene rubber (f) produced by Taiwan Synthetic Rubber Corporation in the presence of a cobalt-iron Ziegler-Natta catalyst and sold under the trade name of Taipol 015H. The operation conditions in Comparative example 2 are similar to those in Comparative example 1.

A visible gel test is adopted to measure the amount of insoluble gel in polymer and includes the steps of:

(1) cutting the elastomeric polymer into cubes each of which has a side of 1-2 mm;

(2) weighing precisely 5 g elastomeric polymer and cutting the same into small fragments;

(3) preparing a flask and adding 250 ml of toluene into the flask;

(4) adding the elastomeric polymer prepared in the step (2) into the flask;

(5) stirring the elastomeric polymer and the toluene for 45-60 minutes by placing the flask on a magnetic stirrer so as to dissolve completely the elastomeric polymer;

(6) filtering the solution of elastomeric polymer by means of a Buchner funnel, a filter paper and an aspirator;

(7) removing the filter paper from the Buchner funnel and pouring a dye agent on the filter paper, the dye agent being 0.1 wt % Dupont Brown Oil dissolved in toluene;

(8) counting the gel point by comparing with a standard sample before the filter paper becomes dry;

(9) obtaining the average gel point count by repeating the visible gel test three times for each elastomeric polymer; and

(10) increasing the gel point count when a gel dot has an enlarged area.

The polymers (d), (e) and (f) are usually used for making an impact-resistant polystyrene and to manufacture tires. Since the polymer solutions (d), (e) and (f) easily undergo crosslinking to form insoluble gels when they undergo the conventional direct solvent removing process, a lot of hard grains or fisheyes are formed on the surface of the resultant modified product when a respective one of the solvent freed polymers (d), (e) and (f) is used for making the impact-resistant polystyrene.

6% by weight of the solvent freed elastomeric polymer is dissolved in styrene monomer and is polymerized with the same in a conventional method so as to form a high impact polystyrene. The resultant product is extruded into a 2 mm thick plate by using a twin screw extruder (ZSK 35) and a sheet extruder. Whether or not fisheyes are formed on the surface of the resultant plate can be observed. The result of such an example will be compared with the result of a control example in which 6% by weight of the elastomeric polymer solution, which does not undergo the solvent removing process, is dissolved in styrene monomer and is polymerized with the same to form the high impact-resistant polystyrene. It can be realized that the resultant plate of the example, which contains the solvent freed elastomeric polymer, has fisheyes formed thereon while the resultant plate of the control example, which contains the elastomeric polymer solution without the solvent removing process, has no fisheyes formed thereon.

Table 3 shows the results of the above analysis and test.

TABLE 3

| polymer solution | gel point count | | time taken before clogging for vents | surface appearance of the resultant plate | |
|---|---|---|---|---|---|
| | without solvent removal | with solvent removal | | without solvent removal | with solvent removal |
| (d) | 3 | 17 | 3 min | good | fisheyes exist |
| (e) | 3 | 16 | 5 min | good | fisheyes exist |
| (f) | 5 | 9 | 5 min | good | fisheyes exist |

Therefore, since insoluble gels are formed in the elastomeric polymer and since fisheyes are formed on the surface of the product when the elastomeric polymer is used for making the high impact-resistant polystyrene, the conventional direct solvent removing process which incorporates the solvent removing apparatus (B) in FIG. 1 is not suitable for treating a heat-sensitive elastomeric polymer solution.

EXAMPLE 1

The process of the present invention and the solvent removing device (B') shown in FIG. 5 are used to treat the polymer solutions with a polymer content of 20% by weight. The polymer solutions include styrene-butadiene-styrene block copolymer (a) with a 30 wt % styrene content, styrene-butadiene-styrene block copolymer (b) with a 10 wt % styrene content, and butadiene homopolymer (c) which have been described in Comparative example 1. The main extruder is of the ZSK 35 type. Twin intermeshing screws are mounted in each ventilation port (40a, 40b, 40c). The pressures of the ventilation ports (40a, 40b, 40c) are 8 mbars, 5 mbars and 5 mbars respectively. Water is used as the stripping agent and is added via the injection port (42) in order to promote the removal of the solvent. The feeding rate of water is 1.25 kg/hr. Screws in the main extruder (4) rotate at a speed of 180 rpm. The feeding rate of the elastomeric polymer solution via the polymer inlet (11) is 125 kg/hr. The heating fluid is steam and has a pressure of 7 bars and a flow rate of 50 kg/hr. The outlet temperature of the static mixer (14) is measured to be between 120° C. and 130° C. The intermeshing twin extruding screws (32) rotate at a rate of 150 rpm. The output rate of the main extruder (4) is 25 kg/hr. Aside from the vacuum unit which is connected to the fluid outlet (30) of the fluid-solid separation chamber (3), a condenser (not shown) is connected to the fluid outlet (30) in order to collect the solvent and the heating fluid. The pressure of the vacuum unit is 12 mbars.

Table 4 shows the times taken from the beginning of the operation of the device (B') until the fluid outlet (30) and the ventilation ports (40a, 40b, 40c) are clogged by each of the powdered elastomeric polymers (a), (b) and (c).

TABLE 4

| polymer solution | outlet (30) | port (40a) | port (40b) | port (40c) |
|---|---|---|---|---|
| (a) | >200 hr | >200 hr | >200 hr | >200 hr |
| (b) | >200 hr | >200 hr | >200 hr | >200 hr |
| (c) | >200 hr | >200 hr | >200 hr | >200 hr |

According to Table 4, it has been known that there is no clogging within an operating period of 200 hours for each of the fluid outlet (30) and the ventilation ports (40a, 40b, 40c). Even though the viscosity and the styrene content of the elastomeric polymer solution are not limited, the ventilation ports remain unclogged and the operation still runs smoothly.

72 kg/hr hexane and 45 kg/hr water can be collected from the condenser when the polymer solution (a) is treated. The amount of the removed hexane is about 72% by weight of the hexane which is originally present in the elastomeric polymer solution (a). The solvent freed elastomeric polymer (a) obtained from the main extruder (4) contains 520 ppm hexane and 3510 ppm water by gas-chromatography. Thus, the solvent removing efficiency of the present invention is high.

EXAMPLE 2

The process of the present invention and the solvent removing device (B') shown in FIG. 5 are used to treat a hexane solution of elastomeric polymer which has a polymer content of 15% by weight. The three elastomeric polymers which are to be treated are similar to those in Comparative example 1 and include styrene-butadiene-styrene block copolymer (a) with a 30 wt % styrene content, styrene-butadiene-styrene block copolymer (b) with a 10 wt % styrene content, and butadiene homopolymer (c). Table 5 shows the times taken from the beginning of the operation of the device (B') until the fluid outlet (30) and the ventilation ports (40a, 40b, 40c) are clogged by each of the powdered elastomeric polymers (a), (b) and (c).

TABLE 5

| polymer solution | outlet (30) | port (40a) | port (40b) | port (40c) |
|---|---|---|---|---|
| (a) | >200 hr | >200 hr | >200 hr | >200 hr |
| (b) | >200 hr | >200 hr | >200 hr | >200 hr |
| (c) | >200 hr | >200 hr | >200 hr | >200 hr |

It can be realized that even though the solvent content in the elastomeric polymer solution is high, the ventilation ports remain unclogged, and the operation still runs smoothly.

EXAMPLE 2

The process of the present invention and the solvent removing device (B') shown in FIG. 5 are further used to treat polymer solutions which include a hexane solution of elastomeric polymer which has a polymer content of 20% by weight. The three elastomeric polymers which are to be treated are similar to those in Comparative example 2 and include low-cis polybutadiene rubber (d), low-cis polybutadiene rubber (e), and high cis polybutadiene rubber (f). The operation conditions in Example 3 are similar to those in Example 1. The times taken from the beginning of the operation of the device (B') until the fluid outlet (30) and the ventilation ports (40a, 40b, 40c) are clogged by each of the powdered elastomeric polymers (d), (e) and (f) are measured.

The visible gel test which has been described in Comparative example 2 is used to count the gel point.

6% by weight of the elastomeric polymer is dissolved in styrene monomer and is polymerized with the same so as to form a high impact-resistant polystyrene, and the resultant product is observed to determine whether o not fisheyes are formed on the surface thereof. The operating process is similar to that described in Comparative example 2. Table 6 shows the results of the analysis and test.

TABLE 6

| polymer solution | gel point count | | time taken before clogging for vents | surface appearance of the resultant plate | |
|---|---|---|---|---|---|
| | without solvent removal | with solvent removal | | without solvent removal | with solvent removal |
| (d) | 3 | 5 | no clogging >200 hr | good | good |
| (e) | 3 | 5 | no clogging >200 hr | good | good |
| (f) | 5 | 7 | no clogging >200 hr | good | good |

According to Table 6, since the elastomeric polymer does not undergo crosslinking due to overheating so that fisheyes will not form on the resultant modified product, it can be realized that the process of the present invention which incorporates the solvent removing device (B') is suitable for treating a heat-sensitive elastomeric polymer solution.

EXAMPLE 4

The process the solvent removing device, the operation conditions and the elastomeric polymer solutions used in Example 4 are similar to those in Example 3 except that the main extruder is an intermeshing counter-rotating twin screw extruder (Plabor Convertwin BT-30-C). Table 7 shows the results of the analysis and test.

TABLE 7

| polymer solution | gel point without solvent removal | gel point with solvent removal | time taken before clogging for vents | surface appearance of the resultant plate without solvent removal | surface appearance of the resultant plate with solvent removal |
|---|---|---|---|---|---|
| (d) | 3 | 3 | no clogging >200 hr | good | good |
| (e) | 3 | 3 | no clogging >200 hr | good | good |
| (f) | 5 | 5 | no clogging >200 hr | good | good |

It can be seen that the gel point count shown in Table 7 are lower than those in Table 6 owing to the screws rotating in opposite directions.

Therefore, the process of the present invention which incorporates the solvent removing device (B') shown in FIG. 5 can heat rapidly and homogeneously the elastomeric polymer solution and can extrude efficiently the elastomeric polymer solution so that the ventilation ports provided in the device (B') can be prevented from being clogged and so that the elastomeric polymer can be prevented from losing its elasticity due to crosslinking.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:

1. A process for removing the solvent from an elastomeric polymer solution which contains at least 8% by weight of elastomeric polymer, said elastomeric polymer solution undergoing a preprocessing step in order to remove a large part of said solvent, thereafter said elastomeric polymer solution being fed into a main extruder which has a screw mechanism provided therein so that said elastomeric polymer solution is moved forward in said main extruder in order to remove remaining said solvent via at least one vapor removal vent of said main extruder, the improvement comprising that said preprocessing step includes the steps of:

(a) introducing a heating fluid and said elastomeric polymer solution into a static mixer in order to mix completely said heating fluid and said elastomeric polymer solution and heat rapidly and homogeneously said elastomeric polymer solution to a temperature of between 60° C. and 250° C.;

(b) spraying the mixture of said heating fluid and said elastomeric polymer solution under a depressurization atmosphere in order to vaporize said heating fluid and said solvent out of said mixture and form a vaporized heating fluid, a vaporized solvent and a powdered elastomeric polymer;

(c) introducing said vaporized heating fluid, said vaporized solvent and said powdered elastomeric polymer into a fluid-solid separation chamber which has a pair of intermeshing twin extruding screws mounted therein; and (d) extruding said powdered elastomeric polymer into said main extruder via a polymer outlet of said fluid-solid separation chamber by means of said intermeshing twin extruding screws while removing said vaporized heating fluid and said vaporized solvent via a vapor outlet of said fluid-solid separation chamber.

2. A process as claimed in Claim 1, wherein the step (d) includes removing said vaporized heating fluid and said vaporized solvent via said vapor outlet by suction.

3. A process as claimed in Claim 1, wherein the step (b) is conducted by spraying said mixture via a nozzle into a vaporizing chamber, which has a gradually diverging cross-section and an inner wall with an anti-stick coating layer.

4. A process as claimed in Claim 1, wherein said intermeshing twin extruding screws used in the step (d) are operated at a speed of 50-300 rpm.

5. A process as claimed in Claim 1, wherein said elastomeric polymer of said elastomeric polymer solution is selected from the group consisting of butadiene homopolymer, isoprene homopolymer, ethylene-propylene block copolymer and vinyl-aromatic/conjugated diene copolymer.

6. A process as claimed in Claim 1, wherein said heating fluid used in step (a) is selected from the group consisting of water, hexane, cyclohexane, heptane, pentane, isopentane, benzene, toluene, ethyl benzene, and acetone.

7. A process as claimed in Claim 6, wherein said heating fluid is introduced in a vapor phase.

* * * * *

UNITED STATES PATENT AND TRADEMARK OFFICE
CERTIFICATE OF CORRECTION

PATENT NO. : 5,283,021
DATED : February 1, 1994
INVENTOR(S) : Solomon W.F. Shih

It is certified that error appears in the above-identified patent and that said Letters Patent is hereby corrected as shown below:

Column 8, Lines 5 and 6
change "styrene-butadiene styrene" to --styrene-butadiene-styrene--;

Column 12, Line 13 in the heading change "EXAMPLE 2" to --EXAMPLE 3--;

Column 12, Line 35 before "not" change "o" to --or--;

Column 12, Lines 44 and 45 in the heading of Table 6 beginning "time taken" after "clogging for" change "vents" to --ports--;

Column 13, Lines 6 and 7 in the heading of Table 7 beginning "time taken" after "clogging for" change "vents to --ports--.

Signed and Sealed this

Fourteenth Day of June, 1994

BRUCE LEHMAN

*Attest:*

*Attesting Officer*   Commissioner of Patents and Trademarks